July 5, 1966  LE ROY D. BARTER  3,259,833
REGULATED POWER SUPPLY
Filed Oct. 15, 1962
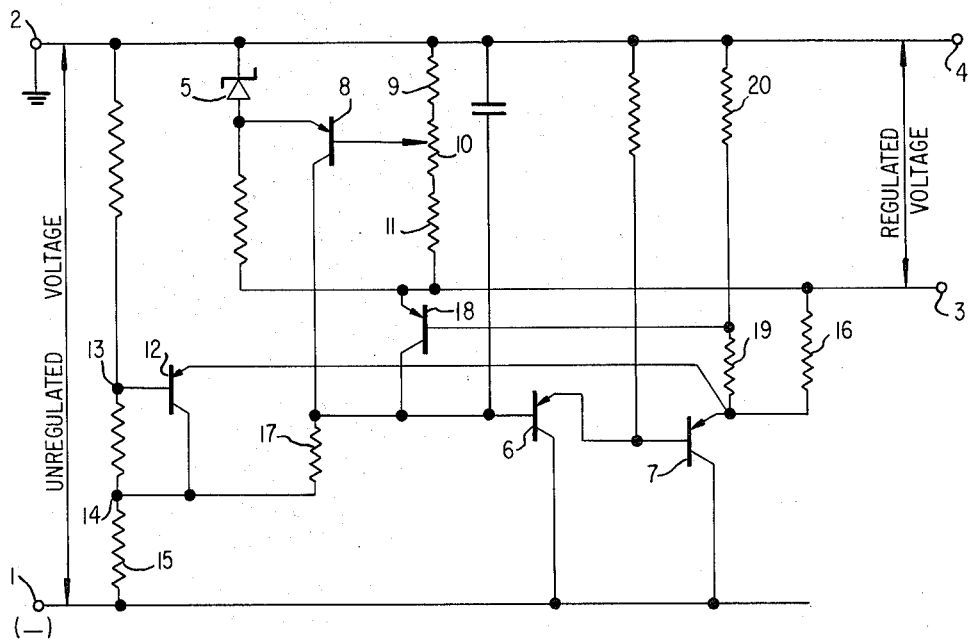
INVENTOR.
Le ROY D. BARTER
BY
Sughrue, Rothwell, Mion and Zinn
ATTORNEYS

United States Patent Office 3,259,833
Patented July 5, 1966

3,259,833
REGULATED POWER SUPPLY
Le Roy D. Barter, Fullerton, Calif., assignor to Beckman Instruments, Inc., a corporation of California
Filed Oct. 15, 1962, Ser. No. 230,501
3 Claims. (Cl. 323—4)

This invention relates to regulated power supplies and more particularly to a regulated power supply in which the conductivity of a series regulating element is increased as the current through the load increases up to a predetermined level at which point the series regulator is cut off to prevent an overload power dissipation which might damage the series regulator.

Regulated power supplies normally include a regulating element in series with the load. Variations in the regulated voltage are sensed and used to control the series regulating element to maintain the regulated voltage constant. When a transistor is used as the series regulating element, it is quite important to prevent it from dissipating excess power. Such overload power will easily damage a transistor series regulator. In some prior art power supplies means have been employed to limit the current through the series regulator to a maximum value, but this maximum current continues to flow through the series element as long as the load has an excessively high conductivity or is shorted. Consequently, the dissipation required of this element increases to the product of maximum current times the unregulated voltage.

Accordingly, it is an important object of the present invention to provide an improved power supply in which the current through a series regulating element is cut off when the load current reaches a maximum predetermined level.

A regulated power supply must provide compensation for variations in the unregulated voltage and must provide compensation for changes in the impedance of the load. Both of these variations may cause increased load current. In response to an increased load current the resistance of the series regulator should be decreased. If this is done, the increased load current is supplied through the series regulating element and the internal resistance of the power supply is maintained at a low value.

It is another object of the invention to use negative load current feedback to lower the internal resistance of a regulated power supply.

It is a further object of the present invention to provide an improved regulated power supply in which the conductivity of a series regulator element increases thus allowing a greater current flow through the series regulator as the load current of the power supply increases up to a predetermined level at which point the series regulator element is rendered non-conducting, thereby preventing undue power dissipation in the series regulator element.

In accordance with one embodiment of the invention, a normal regulated power supply is provided with a series regulator element including two transistors. A reference voltage is established by means of a Zener diode. The regulated voltage is compared to the reference voltage by means of a transistor. The output of this transistor, indicating fluctuations in the regulated voltage, controls the series regulator transistors to maintain the output voltage constant.

My invention comprises an improvement to the power supply just described. In accordance with this invention, a current sensing resistor is connected between the series regulating element and the load. The voltage across this resistor is coupled through an amplifying transistor to the base of the series regulator transistor in such a manner that the series regulator transistor is turned on as the current through the load increases. A second amplifying transistor is provided to sense when the load current reaches a level which might damage the series regulator transistor. When the load current increases to a predetermined level, the voltage drop across the current sensing resistor is such that the second amplifying transistor is turned on and this cuts off the series regulating transistors. In this manner, the series regulating transistors are turned on with increasing load current up to a predetermined level at which point the series regulating transistors are turned off to prevent undue power dissipation.

These and other objects, features, and advantages of the present invention may be better understood from the following more detailed description and appended claims in conjunction with the single drawing which shows a circuit diagram of the regulated power supply.

Referring to the drawing, an unregulated voltage is applied between terminals 1 and 2 and a regulated voltage is available at the output terminals 3 and 4. As shown, the terminal 2 is connected to ground potential and the terminal 1 is connected to a negative source of voltage. A suitable load is connected across output terminals 3 and 4.

Means are provided, including a Zener diode 5, for establishing a reference voltage. A series regulating element including the cascaded transistors 6 and 7 is connected in series with the load. Means are provided for controlling the series regulating transistors 6 and 7 in accordance with variations in the voltage across the load with respect to the reference voltage established by the Zener diode 5. These means include the transistor 8 and resistors 9, 10, and 11 connected across the load. The adjustable tap on resistor 10 is used to set the voltage at which the power supply is to be regulated. The current in the collector of transistor 8 is proportional to the difference between the voltage across terminals 3 and 4 and the desired voltage as established by the reference voltage from Zener diode 5 and the setting of variable resistor 10. The collector of transistor 8 is connected to the base of transistor 6 and the voltage developed at the collector of transistor 8 controls the series regulating transistors 6 and 7.

A first amplifying transistor 12 is provided to keep the voltage fluctuations of the unregulated power supply away from the input of the series regulating transistors 6 and 7. The base and collector of amplifying transistor 12 are connected respectively to intermediate taps 13 and 14 on the unregulated power supply. In the absence of transistor 12, an increase in the unregulated voltage would cause junction 14 to become more negative. This more negative voltage, when applied to the base of transistor 6 via a resistor 17, causes the conductance of the series regulator to increase. This effect would be overcome by the regulating action of transistor 8, but the change in unregulated voltage has an adverse effect upon the series regulator. Transistor 12 and associated circuitry overcome this adverse effect. When the voltage of the unregulated power supply increases, terminal 13 becomes more negative thereby rendering transistor 12 more conductive. The increased current through transistor 12 causes an increased voltage drop across the resistor 15. The increased voltage drop across resistor 15 is applied to the base of transistor 6, thereby rendering the series regulator less conductive. The operation of the power supply thus far described is explained in more detail in U.S. Patent Number 3,116,447 entitled "Transistorized Voltage Regulator," issued on December 31, 1963, to Barter and assigned to Beckman Instruments, Inc.

The power supply thus far described forms no part of the present invention. In accordance with the present invention, a current sensing resistor 16 is connected in series between the regulator and the load. The lower terminal of resistor 16 is connected to the emitter of amplifying transistor 12 causing it to change the potential across resistor 17. This causes the current through series regulating transistors 6 and 7 to increase with increases in load current flowing through current sensing resistor 16. The addition of resistor 16 to the circuit causes current fluctuations of the load, due to variations in impedance, to appear at the emitter of the amplifying transistor 12. The voltage between terminal 4 and the emitter of transistor 7 is the input voltage to the amplifying transistor 12 and the voltage between the common terminal 4 and the junction 14 is the output voltage. When a reduced impedance of the load causes the voltage drop across resistor 16 to increase, the amplifying action of transistor 12 causes a larger change in the potential of terminal 14 with respect to the common terminal. This tends to increase the conductivity of the series regulator and keeps the regulated voltage terminal constant. The first amplifying transistor 12 provides feedback from the current sensing resistor 16 to the series regulating elements 6 and 7 so that increases in the load current are supplied by the increased conductance of transistors 6 and 7.

Further in accordance with this invention, means are provided for rendering the series regulating transistors non-conducting when the load current exceeds a predetermined level. A second amplifying transistor 18 is provided for this purpose. Resistors 19 and 20 form a potential divider which provides a reverse bias voltage for the base of transistor 18. Throughout the normal current range of the regulator, the potential drop across resistor 16 is less than the potential drop across resistor 19. Since resistor 16 is connected to the emitter of transistor 18 and resistor 19 is connected to the base of transistor 18, the transistor 18 will normally be reverse biased. However, when the current through the load increases above a predetermined level the voltage drop across resistor 16 exceeds the voltage drop across the resistor 19 and the transistor 18 is forward biased. When transistor 18 conducts, a positive going potential is applied to the bases of transistors 6 and 7 and these transistors are cut off. The second amplifying transistor 18 provides positive feedback from the current sensing resistor 16 to the series regulating transistors 6 and 7 to render these transistors non-conducting when an excessively high conductance appears across output terminals 3 and 4.

The operation of the regulated power supply is as follows. Under normal operating conditions, variations in the unregulated voltage across terminals 1 and 2 and variations in load current between terminals 3 and 4 are compensated for by action of the amplifying transistor 12 and the series regulators 6 and 7. In accordance with this invention, when the load current increases a greater voltage is developed across current sensing resistor 16. This voltage is coupled through the transistor 12 to the bases of series regulators 6 and 7 thereby causing these transistors to conduct more fully. Therefore, the increased load current is supplied through the series regulating transistors. Consequently, the increase of load current does not have to be supplied by a change of voltage across terminals 3–4 which, when sensed by transistor 8, would cause the series regulators 6 and 7 to conduct more fully. By providing current feedback developed across the sensing resistor 16, the increased load current is supplied without a change in voltage across the load connected between terminals 3 and 4.

As the current through resistor 16 approaches the predetermined maximum level, the voltage drop across resistor 16 becomes greater than the voltage drop across the resistor 19. Therefore, the emitter of transistor 18 becomes positive with respect to the base and the transistor 18 is forward biased. The voltage at the collector of transistor 18 provides a reverse bias for series regulating transistors 6 and 7. The otherwise regulated potential across terminals 3 and 4 drops to near zero. The small load current which flows during overload passes through resistor 16, transistor 12, and resistor 15. The emitter of transistor 18 remains positive with respect to the base until the load resistance increases to a normal value. At this time, the voltage drop across resistor 19 again becomes larger than the voltage drop across resistor 16; transistor 18 is cut off; series regulating transistors 6 and 7 again conduct and the regulation returns. When the short circuit or high conductance across the load is removed, the circuit quickly recovers regulation and does not get into a locked up condition in which there is no regulation.

While a particular embodiment of the invention has been shown and described, it will, of course, be understood that various changes may be made without departing from the principles of the invention. The appended claims are, therefore, intended to cover any such modifications within the true spirit and scope of the invention.

What I claim as new and desire to secure by Letters Patent of the United States is:

1. In a power supply for supplying power to a load, a voltage regulating circuit having a common terminal, an unregulated voltage terminal and a regulated voltage terminal, comprising a series regulating element having a control input;

a current sensor, said series regulating element and said current sensor being connected in series between said unregulated voltage terminal and said regulated voltage terminal;

means for generating a reference voltage across said common terminal and said regulated voltage terminal;

means for generating an electrical difference signal in accordance with the difference between said reference voltage and at least a portion of the voltage across said common terminal and said regulated voltage terminal;

means for applying said electrical difference signal to said control input of said series regulating element, thereby regulating the voltage between said common terminal and said regulated voltage terminal;

a first voltage divider connected across said common terminal and said unregulated voltage terminal, said first voltage divider including first, second and third resistors connected in series;

a first amplifier having a first input connected to the junction of said second and third resistors, a second input connected to the junction of said current sensor and said series regulating element and an output connected to the junction of said first and second resistors and resistively connected to said control input of said series regulating element, whereby said series regulating element is isolated from voltage fluctuations at the unregulated voltage terminal;

a second voltage divider comprising fourth and fifth resistors connected in series between said common terminal and said junction of said current sensor and said series regulating element;

a second amplifier having a first input connected to the junction of said fourth and fifth resistors, a second input connected to said regulated voltage terminal and having an output connected to said control input of said series regulating element whereby, during overload, said second amplifier operates to cut off the conductance of said series regulating element.

2. In a power supply, the voltage regulating circuit as defined in claim 2, in which said current sensor comprises a resistance element.

3. In a power supply, the voltage regulating circuit as defined in claim 1, in which said first amplifier includes a first transistor having base, emitter, and collector electrodes, said first input being connected to said base electrode, said second input being connected to said emitter electrode and said output being said collector electrode;

said second amplifier includes a second transistor having base, emitter and collector electrodes, said first input being connected to said base electrode, said second input being connected to said emitter electrode and said output being said collector electrode; and, said series regulating element comprising third and four transistors each having base, emitter and collector electrodes, the emitter of said third transistor being connected to the base of said fourth transistor, said difference signal being applied to the base of said third transistor, the emitter of said fourth transistor being connected to said current sensing resistance element, and the collectors of said third and fourth transistors being both connected to said unregulated voltage terminal.

References Cited by the Examiner

UNITED STATES PATENTS

| | | | |
|---|---|---|---|
| 2,853,673 | 9/1958 | Fredrick | 323—22 |
| 2,904,742 | 9/1959 | Chase | 323—22 |
| 3,076,135 | 1/1963 | Farnsworth | 323—22 |

JOHN F. COUCH, *Primary Examiner.*

LLOYD McCOLLUM, *Examiner.*

K. W. HADLAND, K. D. MOORE, *Assistant Examiners.*